United States Patent
Ali-Mehenni et al.

(10) Patent No.: US 6,473,026 B1
(45) Date of Patent: Oct. 29, 2002

(54) TECHNIQUE FOR ESTIMATING RAINFALL FROM A METEOROLOGICAL RADAR WITH POLARIZATION DIVERSITY

(75) Inventors: Mustapha Ali-Mehenni, Le Vesinet; Estelle Obligis, Croissy; Jacques Victor Testud, Paris, all of (FR)

(73) Assignee: Centre National de la Recherche Scientifique (CNRS) (FR)

( * ) Notice: Subject to any disclaimer, the term of this patent is extended or adjusted under 35 U.S.C. 154(b) by 0 days.

(21) Appl. No.: 09/601,017
(22) PCT Filed: Jan. 22, 1999
(86) PCT No.: PCT/FR99/00134
§ 371 (c)(1), (2), (4) Date: Nov. 14, 2000
(87) PCT Pub. No.: WO99/38028
PCT Pub. Date: Jul. 29, 1999

(30) Foreign Application Priority Data

Jan. 23, 1998 (FR) .............................. 98 00714

(51) Int. Cl.⁷ ............................ G01S 13/95; G01S 7/02
(52) U.S. Cl. ........................................ 342/26; 342/188
(58) Field of Search ........................ 342/26, 188; 702/3

(56) References Cited

U.S. PATENT DOCUMENTS 5,500,646 A * 3/1996 Zrnic .......................... 342/188
6,061,013 A * 5/2000 Sauvageot et al. ............ 342/26

OTHER PUBLICATIONS

Scarchilli et al., "Self-Consistency of Polarization Diversity Measurement of Rainfall," IEEE Transactions on Geoscience and Remote Sensing, vol. 34, No. 1, Jan. 1996.*

Antar, Y. M., "Some Considerrations in Remote Sensing of Rain by Polarization Diversity Radars," Antennas and Propagation Society International Symposium, Jun. 1988, INSPEC Accession No. 3338596.*

Antar et al., "Circular Polarization for Remote Sensing of Precipitation: Polarization Diversity WOrk at the National Research Council of Canada" IEEE Antennas and Propagation Magazine, vol. 34, No. 6, Dec. 1992.*

Goddard J W F et al: "Technique for Calibration of meteorological radars using differential phse" Electronics Letters, vol. 30, No. 2, Jan. 20, 1994, pp. 166–167.

Gorgucci e et. al.: "Calibration of radars using polarimetric techniques" IEEE Transactions on Geoscinece and Remote sensing vol. 30, No. 5, Sep. 1, 1992, pp. 853–857.

* cited by examiner

*Primary Examiner*—Ian J. Lobo
(74) *Attorney, Agent, or Firm*—Blakely Sokoloff Taylor & Zafman

(57) ABSTRACT

Process for estimating a precipitation rate by means of a bipolar radar, characterized by the following various steps: the differential phase Φdp and the attenuated reflectivity Z according to at least one of the polarizations H or V are measured by means of said bipolar radar, over a given interval $[r_1, r_0]$ of path radius r with respect to said radar; an estimate of the value $K(r_0)$ of the attenuation at $r_0$ is determined from the attenuated reflectivity profile thus measured, as well as from the difference in the differential phase between $r_0$ and $r_1$; an estimate $K(r)$ of the specific attenuation at r as a function of the attenuation $K(r_0)$ thus determined and of the attenuated reflectivity profile $Z(r)$ is determined; the rate of precipitation $R(r)$ is determined knowing $K(r)$.

4 Claims, 16 Drawing Sheets

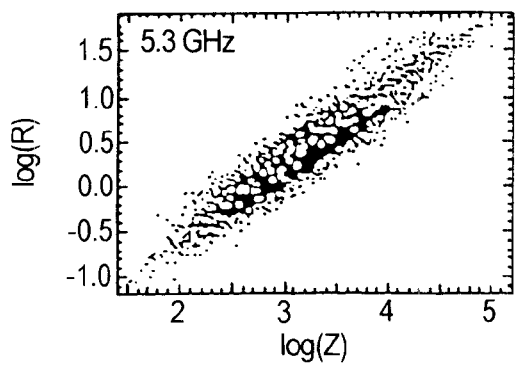
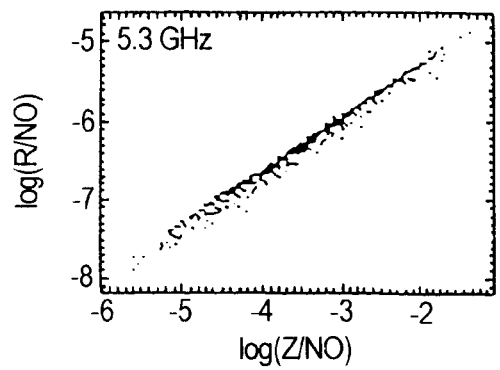
FIG. 1a  FIG. 1b
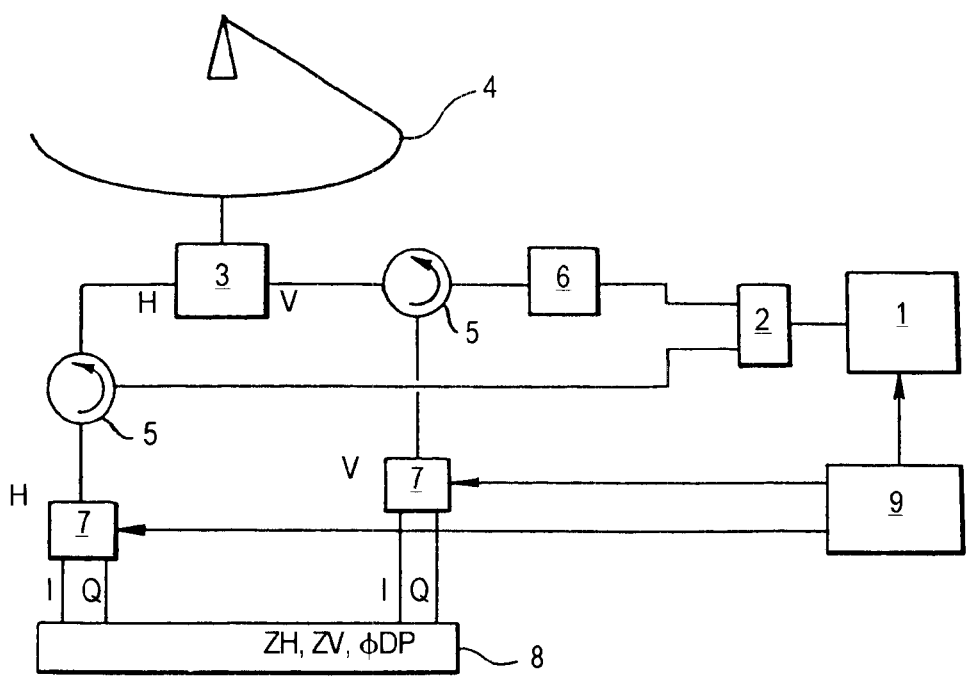
FIG. 2

TECHNIQUE FOR ESTIMATING RAINFALL FROM A METEOROLOGICAL RADAR WITH POLARIZATION DIVERSITY

BACKGROUND OF THE INVENTION

The present invention relates to meteorological techniques for estimating a precipitation rate by means of a radar.

For cost reasons, the radars of the European network operate in C-band, a frequency which is substantially attenuated on traversing internal rains, this making the retrieval of the precipitation rate much trickier than in S-band where the attenuation effects are more limited.

In applications to urban hydrology, the X-band is even envisaged, but attenuation by rain then plays a very important role, and it becomes crucial to take it into account.

In this regard, reference may advantageously be made to their publication: HITSCHFELD-BORDAN, 1954, "Errors inherent in the radar measurement of rainfall at attenuating wavelengths", J. Meteor, 11, pp. 58–67. Unfortunately, in an actual application where the data are noisy and where one may be in the presence of a calibration error (even a small one), this solution turns out to be numerically unstable.

To alleviate this drawback, a proposal has already been made to operate under polarization diversity and to utilize the differential reflectivity ZDR, which is the ratio of the reflectivities under H and V polarization.

As it falls, a raindrop undergoes aerodynamic flattening, the consequence of which is that its scattering cross section is larger for H polarization than for V polarization. In a radar operating at attenuated frequency, the parameter ZDR results from two effects with opposite tendencies: on the one hand, the effect of differential backscattering (which tends to increase ZDR with the mean size of the drops), and on the other hand, the effect of differential attenuation (with the opposite tendency).

FIELD OF THE INVENTION

For a recent example of determining a precipitation rate from a dual-polarization radar, reference may advantageously be made to patent application FR-2 742 876, as well as to the publication: "Polarimetric Radar at Attenuated Wavelenghts as a Hydrological sensor"—M. SAUVAGEOT—Journal of etmosyheric and oceanic technology—vol. 13—p. 630–637, 1996.

However, it is not easy to measure the coefficient ZDR.

The dynamic range of variation of ZDR is around 1 to 2 and therefore covers a few dB at the very most. Furthermore, this measurement requires cross-calibration of the H and V channels to within a tenth of a dB; integration over numerous independent samples so as to temper the statistical fluctuation of the signal, and a very good performance of the antenna (sidelobes at 30 dB—outward—below the main lobe).

Alternatively, there has also been a proposal, in particular in the publication: "Differential propagation phase shift and rainfall rate estimation"—M. SACHINANDA, D.S. ZRNIC—Radio science—vol. 21, no. 2, p. 235–247, March–April 1986. to utilize another parameter, namely the differential phase (denoted $\Phi dp$). This is because the flattening of the raindrop does not affect only the backscattering cross section inducing the asymmetry $\sigma_H > \sigma_V$ (where $\sigma_H$ and $\sigma_V$ represent the cross sections for H and V polar, respectively), but also the propagation of the radar wave whose wave vector is affected as much in respect of its imaginary part (the specific attenuation is greater for H polarization than for V polarization, differential attenuation effect mentioned earlier), as in respect of its real part (where the asymmetry between H and V translates into a differential variation of the phase along the path. In actual fact, the derivative of $\Phi dp$ along the radius (rate of variation of $\Phi dp$ denoted Kdp) is almost proportional to the precipitation rate (and hence $\Phi dp$, to the integrated precipitation rate), which explains the benefit of measuring it.

The estimator of Kdp exhibits numerous advantages: it is insensitive to attenuation along the path; it is insensitive to a radar calibration error; it is much less affected than ZDR by the sidelobes of the antenna; it is entirely unaffected by partial masking of the antenna beam (which occurs routinely when operating at low elevation).

However, it exhibits the major drawback of being greatly affected by noise since it results from differentiating $\Phi dp$ along the beam. The measurement of Kdp therefore requires a long integration time, which is incompatible with the hydrological application which demands fast scanning of the radar beam.

BRIEF DESCRIPTION OF THE DRAWINGS

For its part, the invention proposes a technique which makes it possible to alleviate the drawbacks of the prior techniques and which implements simple processing which is reliable and robust, in particular with regard to the statistical measurement noise (thereby allowing fast scanning).

More particularly, the invention proposes a process for estimating a precipitation rate by means of a bipolar radar, characterized by the following various steps:

the differential phase $\Phi dp$ and the attenuated reflectivity Z according to at least one of the polarizations H or V are measured by means of said bipolar radar, over a given interval $[r_1, r_0]$ of path radius r with respect to said radar, an estimate of the value $K(r_0)$ of the attenuation at $r_0$ is determined from the attenuated reflectivity profile thus measured, as well as from the difference in the differential phase between $r_0$ and $r_1$;

an estimate $K(r)$ of the specific attenuation at r as a function of the attenuation $K(r_0)$ thus determined and of the attenuated reflectivity profile $Z(r)$ is determined;

the rate of precipitation $R(r)$ is determined knowing $K(r)$.

Advantageously, an estimate of the value $K(r_0)$ of the attenuation $r_0$ is determined from the equation $$K(r_0) \int_{r_1}^{r_0} \frac{Z^b(s)}{Z^b(r_0) + K(r_0) \cdot I(s, r_0)} ds = \gamma \cdot (\phi_{dp}(r_0) - \phi_{dp}(r_1))$$

where:

$$I(s, r_0) = 0.46 b \int_{r_1}^{r_0} Z^b(u) du$$

and b is the exponent of the power relation $$K(r) = a Z(r)^b$$

and where $\gamma$ is the parameter of proportionality between the specific attenuation and the differential rate of variation of the phase.

Preferably, an estimate K(r) of the specific attenuation is determined as a function of r from the equation $$\frac{Z^b(r)}{K(r)} - \frac{Z^b(r_0)}{K(r_0)} = I(r, r_0).$$

Advantageously, the attenuated reflectivity Z is measured for both of the two polarizations H or V and the precipitation rate R(r) for a given path radius r is determined for both of these two polarizations.

The invention also relates to a device for estimating a precipitation rate comprising a bipolar radar, as well as processing means, characterized in that said radar comprises means for measuring the differential phase Φdp and the attenuated reflectivity Z according to at least one of the polarizations H or V and in that the processing means implement the various processing steps of the process according to claim 1.

BRIEF DESCRIPTION OF THE DRAWINGS

Other characteristics and advantages of the invention will emerge further from the description which follows, which is purely illustrative and non-limiting and should be read in conjunction with the appended drawings in which:

FIGS. 1a and 1b are graphs on which are plotted scattergrams illustrating the relevance of a parametric representation used in one mode of implementation of the invention;

FIG. 2 illustrates a device for implementing the process in accordance with the invention;

FIGS. 3a to 3c, 4a to 4c, 5a to 5c are graphs, in which it has been assumed that the radar beam intercepts two rain cells of gaussian form and on which have been plotted the parameters Z, K and R for various values of the parameter No (defined later in the description) of dimensional distribution of the raindrops.

Figure 3A:
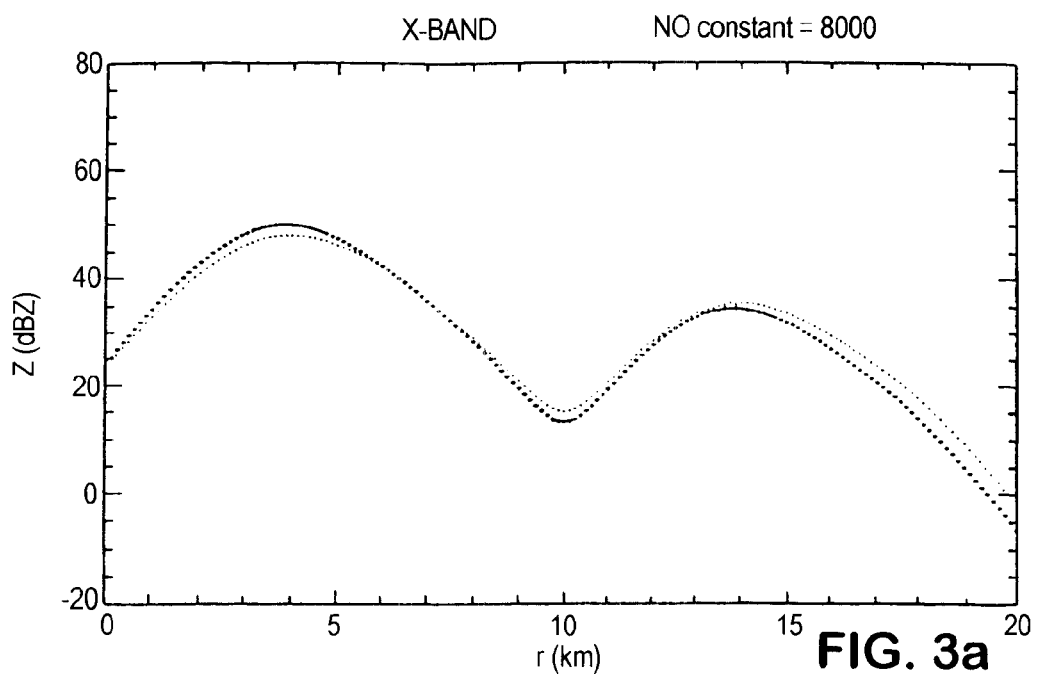
Figure 3B:
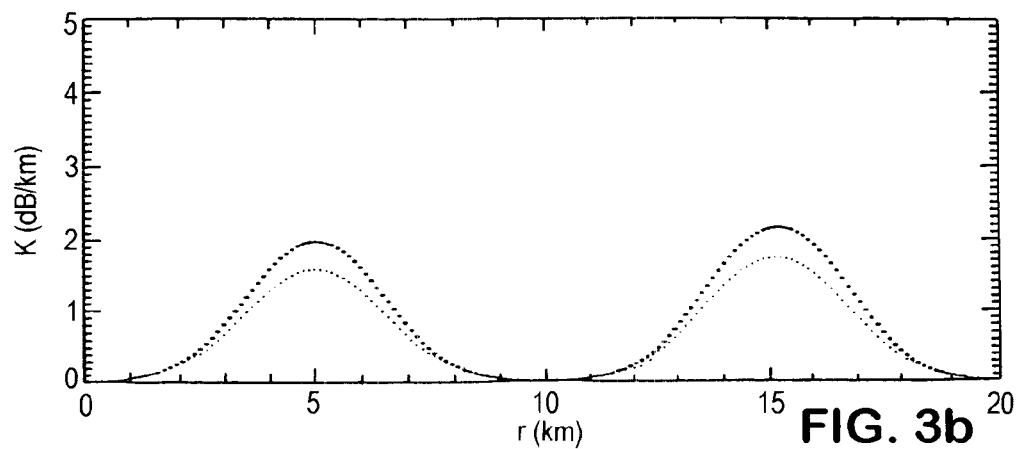
Figure 3C:
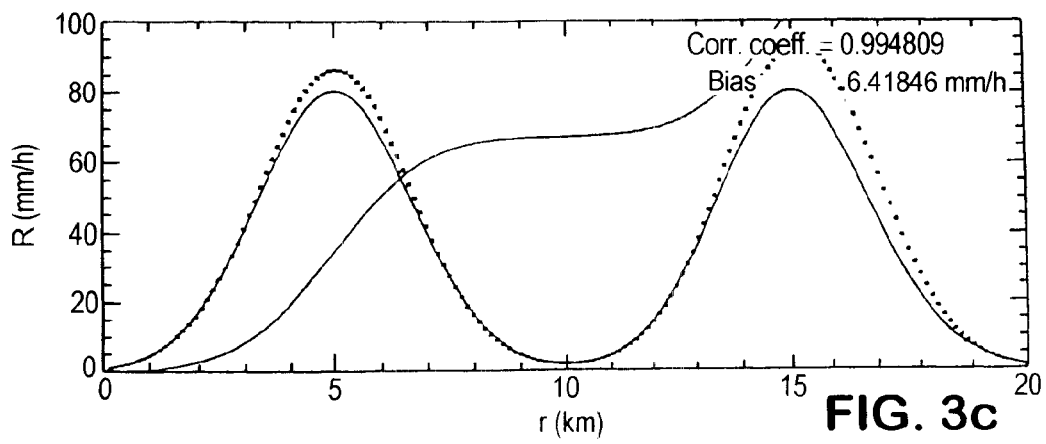
Figure 4A:
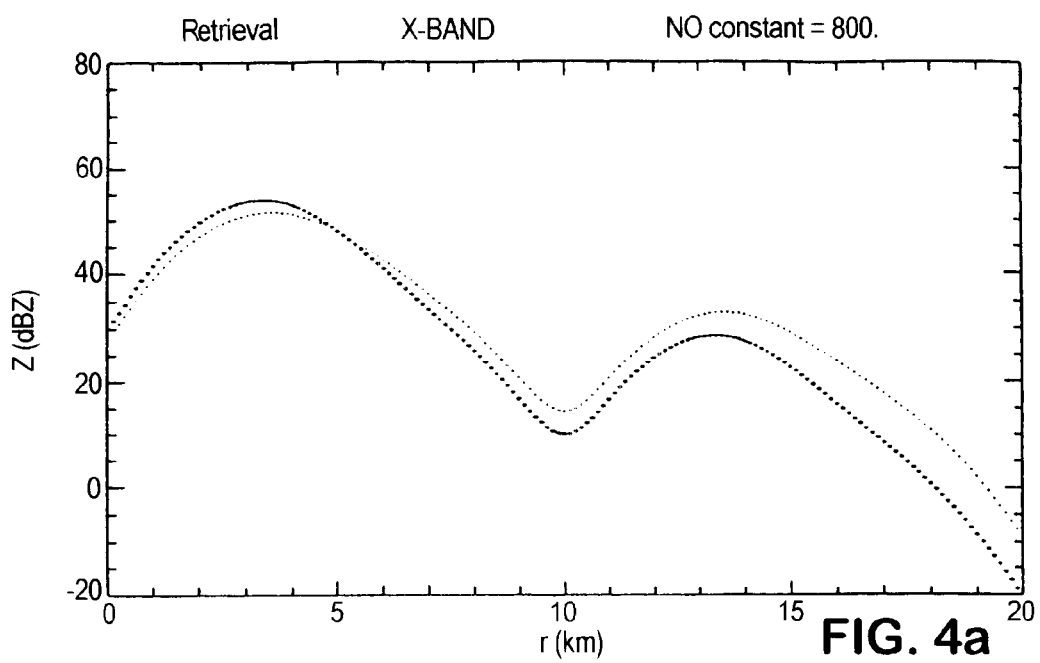
Figure 4B:
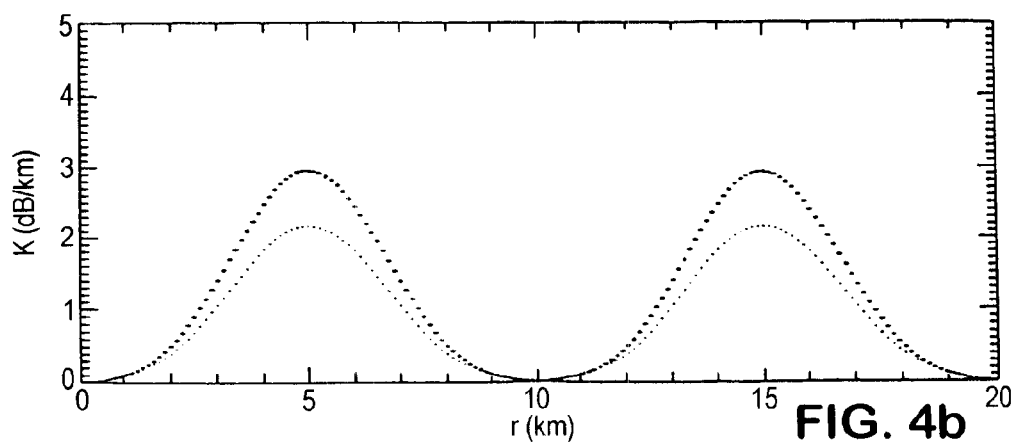
Figure 4C:
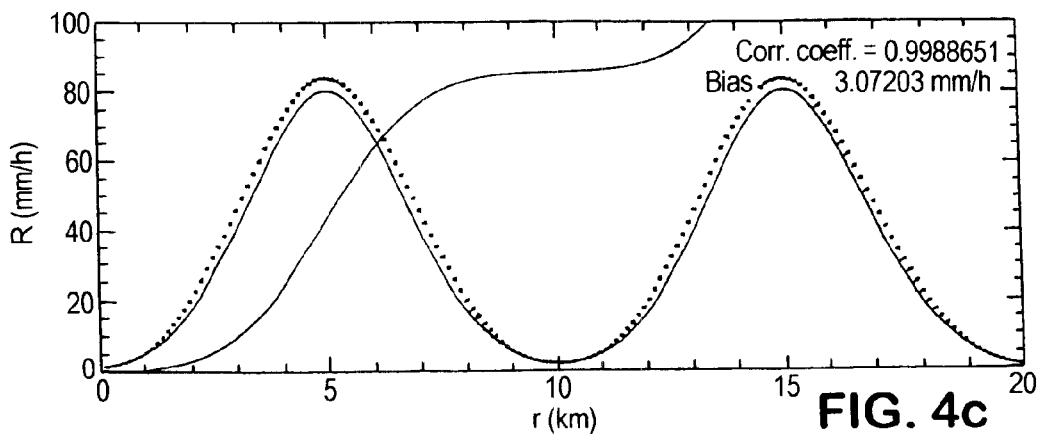
Figure 5A:
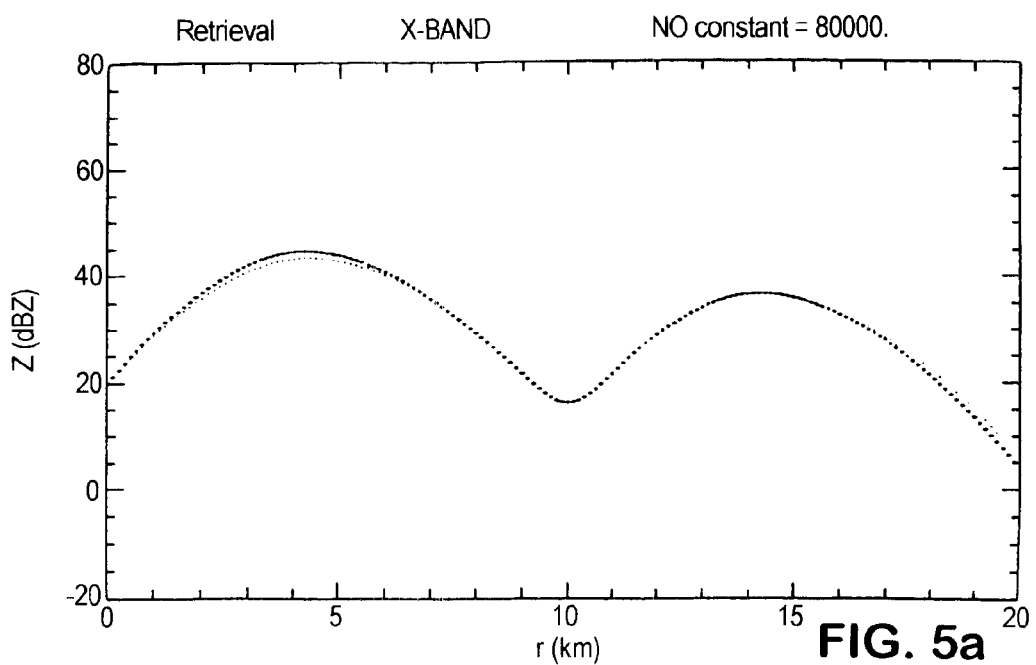
Figure 5B:
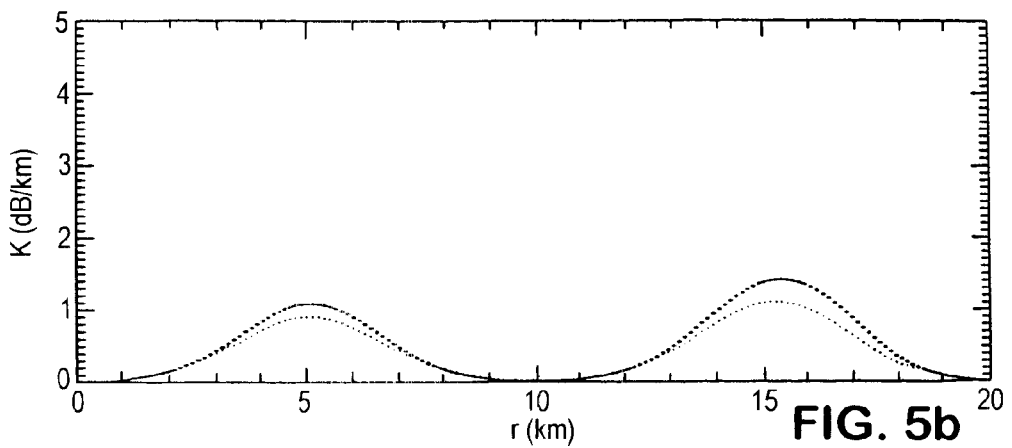
Figure 5C:
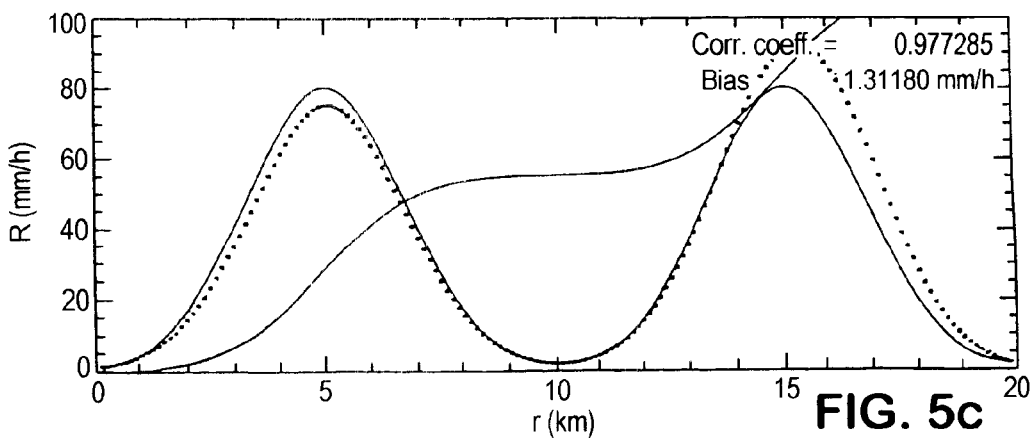
Figure 6:
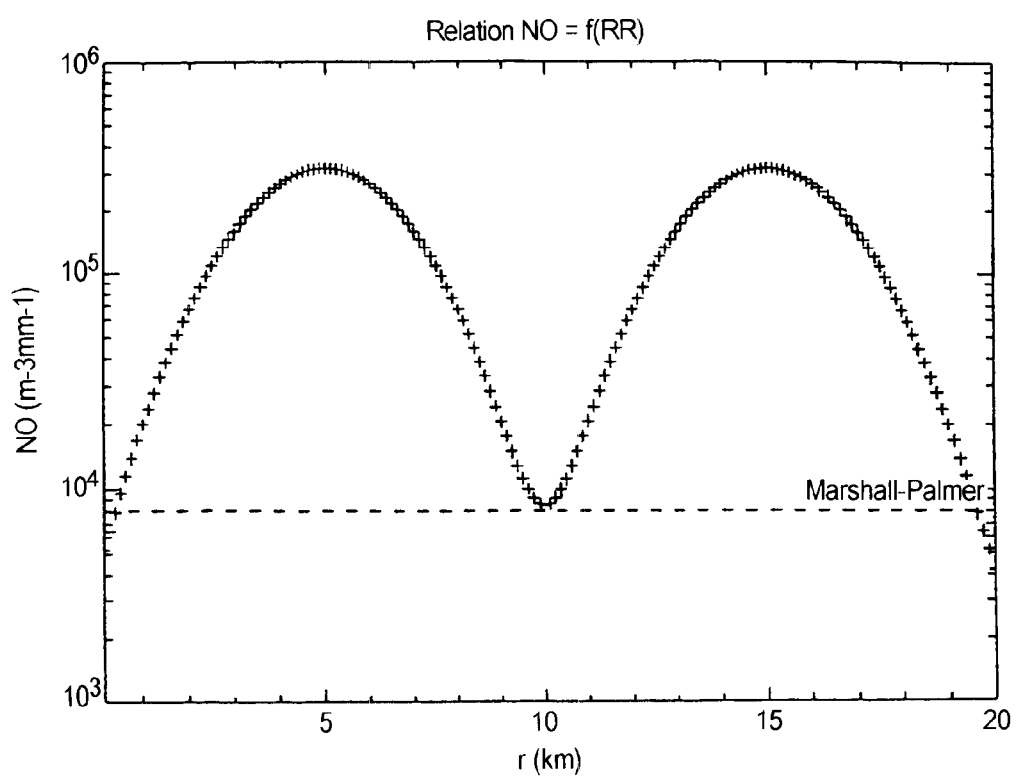
Figure 7A:
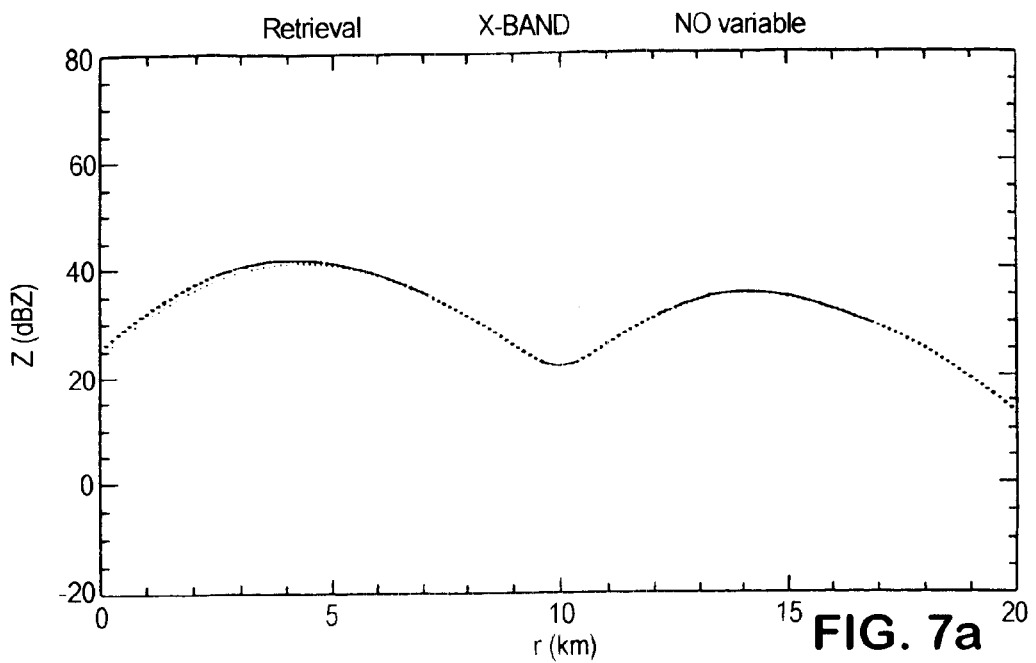
Figure 7B:
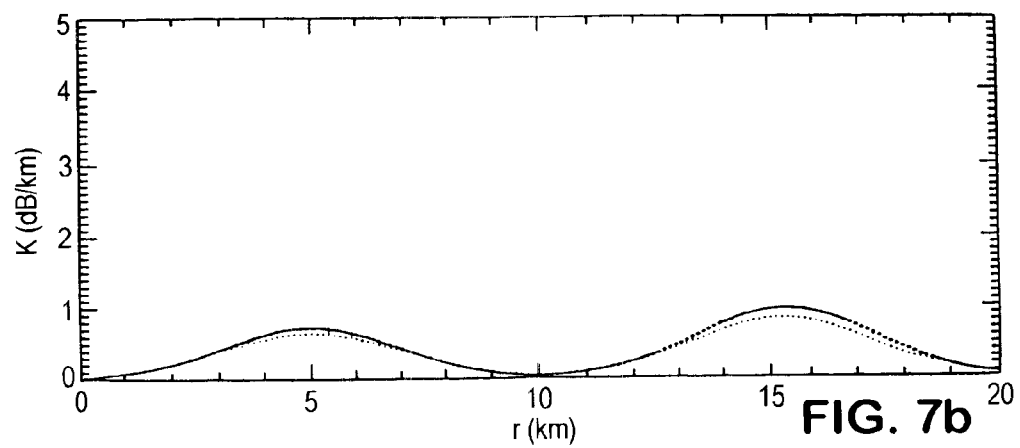
Figure 7C:
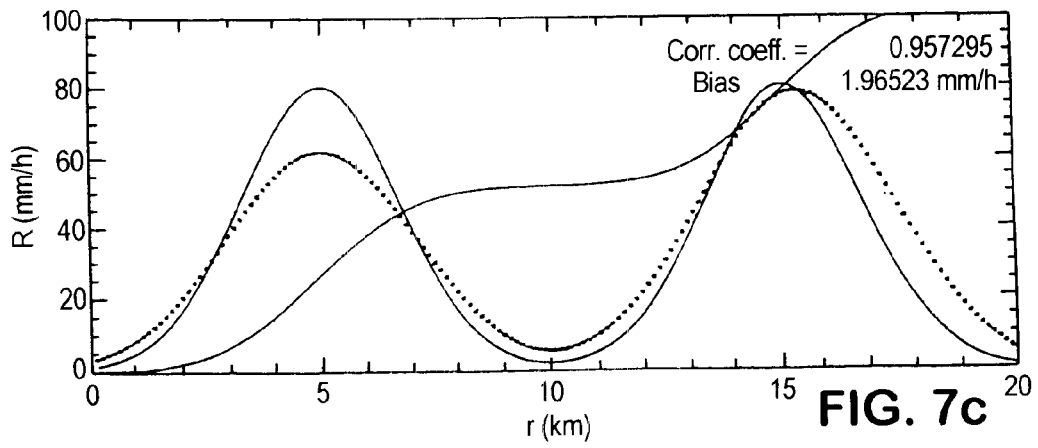
Figure 8A:
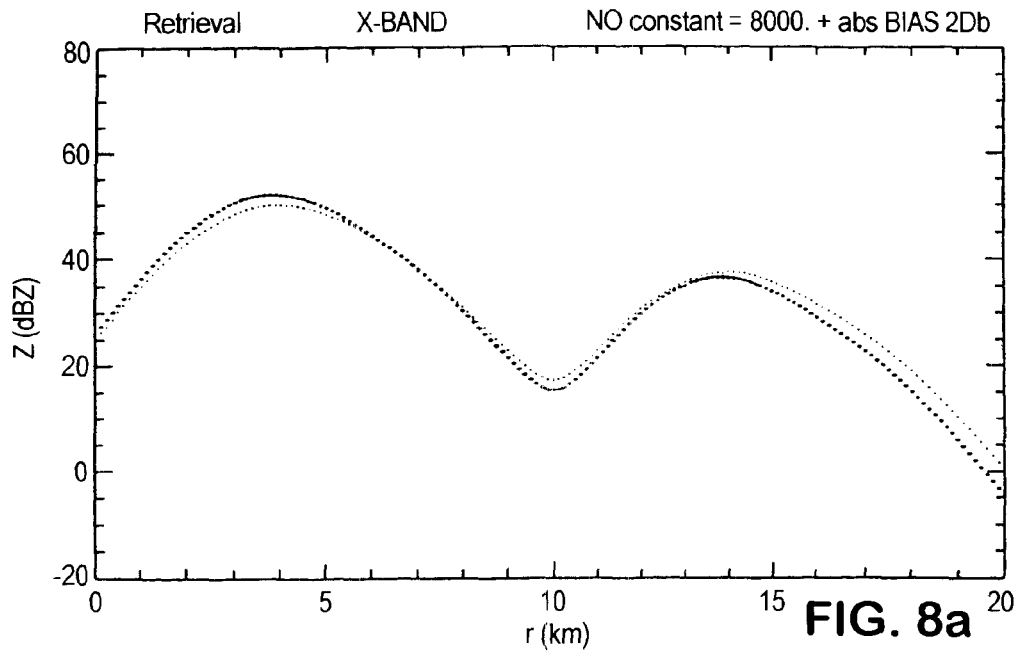
Figure 8B:
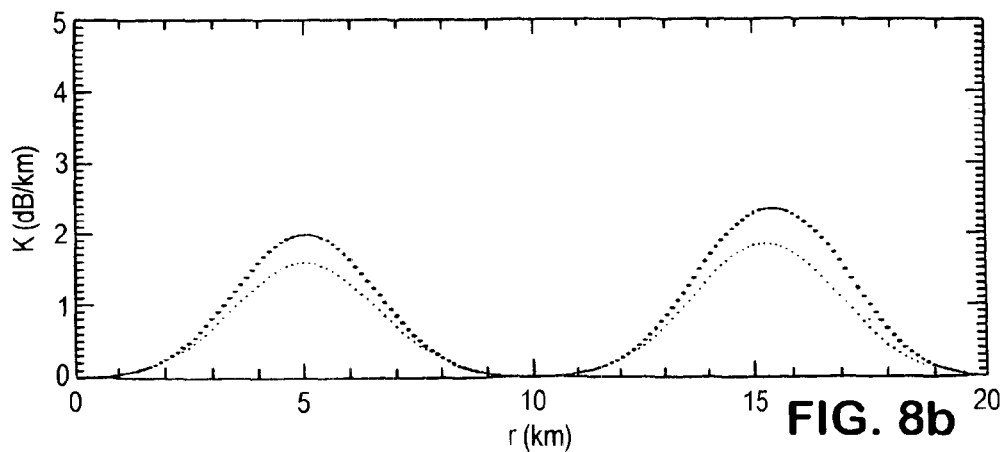
Figure 8C:
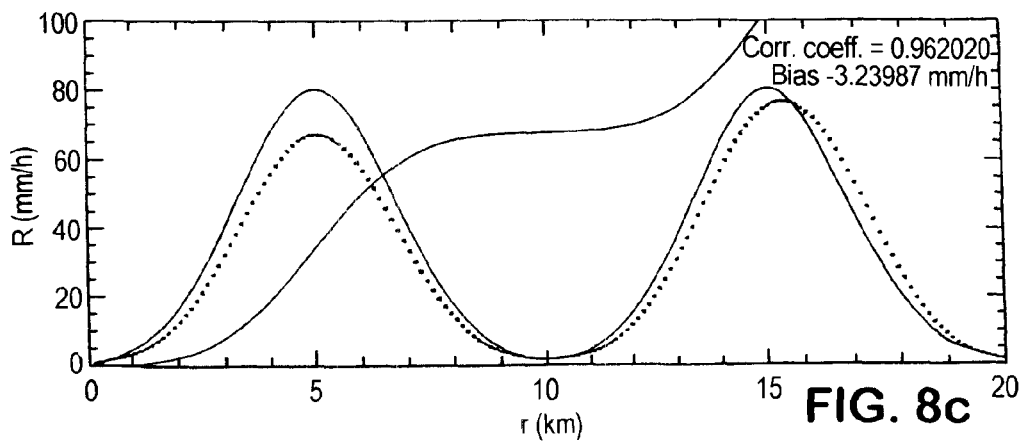
Figure 9A:
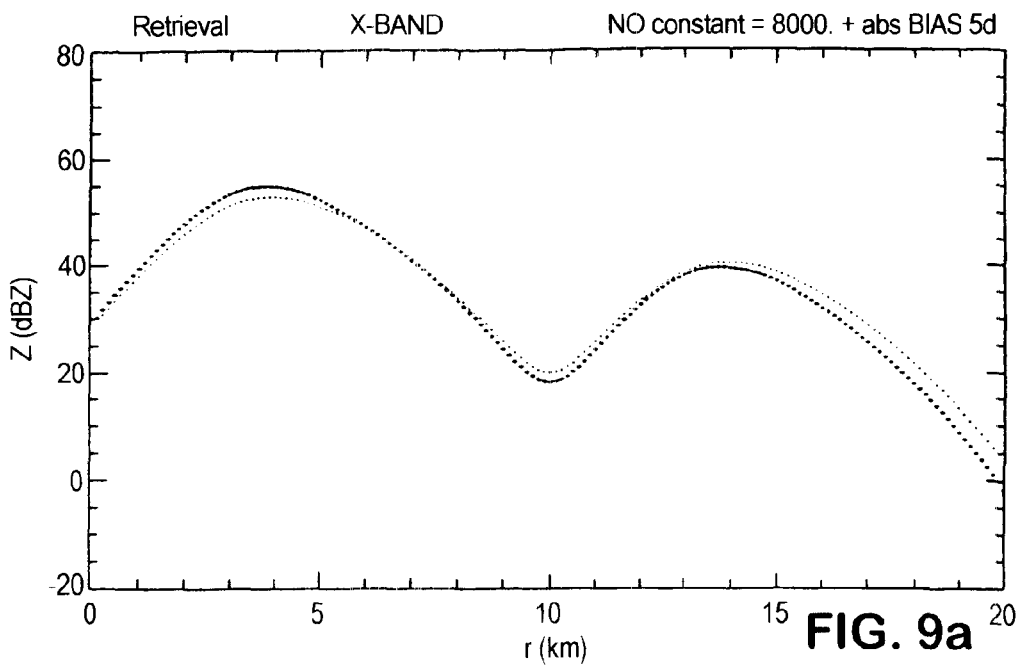
Figure 9B:
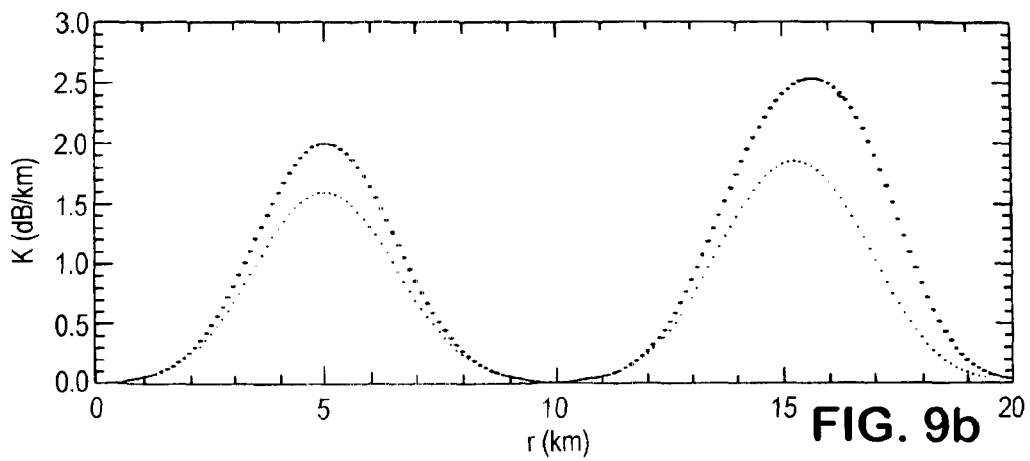
Figure 9C:
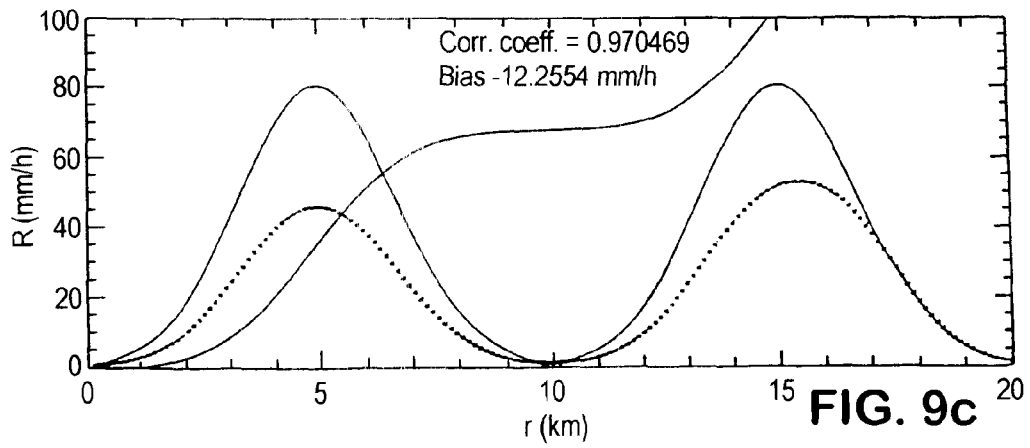
Figure 10A:
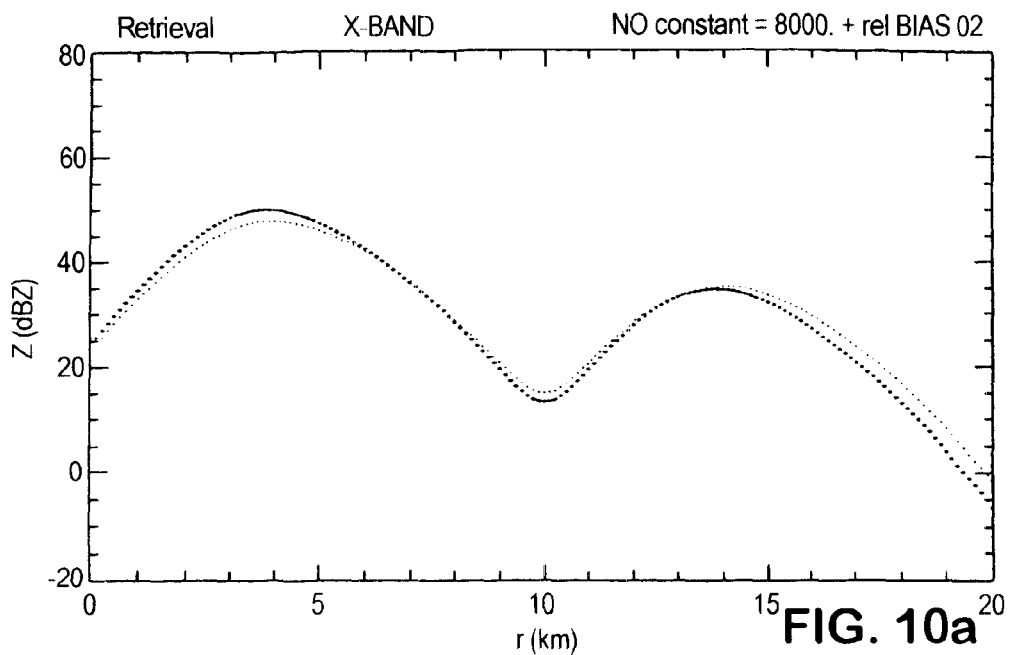
Figure 10B:
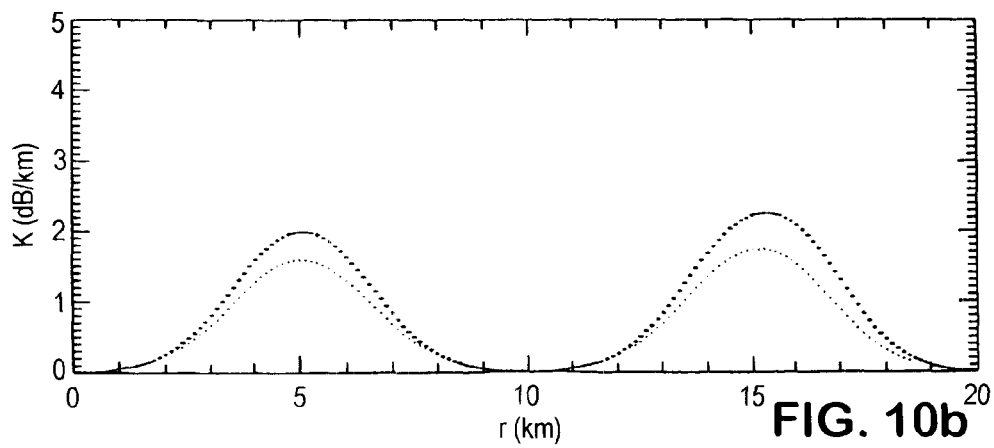
Figure 10C:
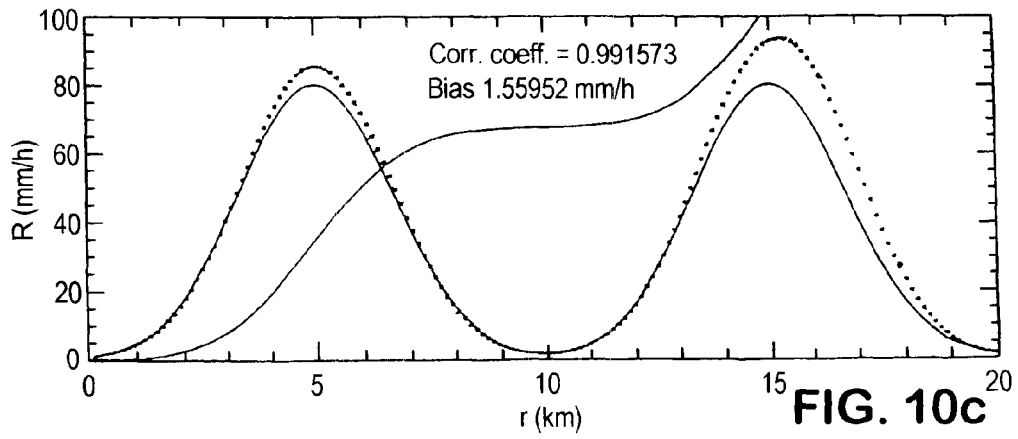
Figure 11A:
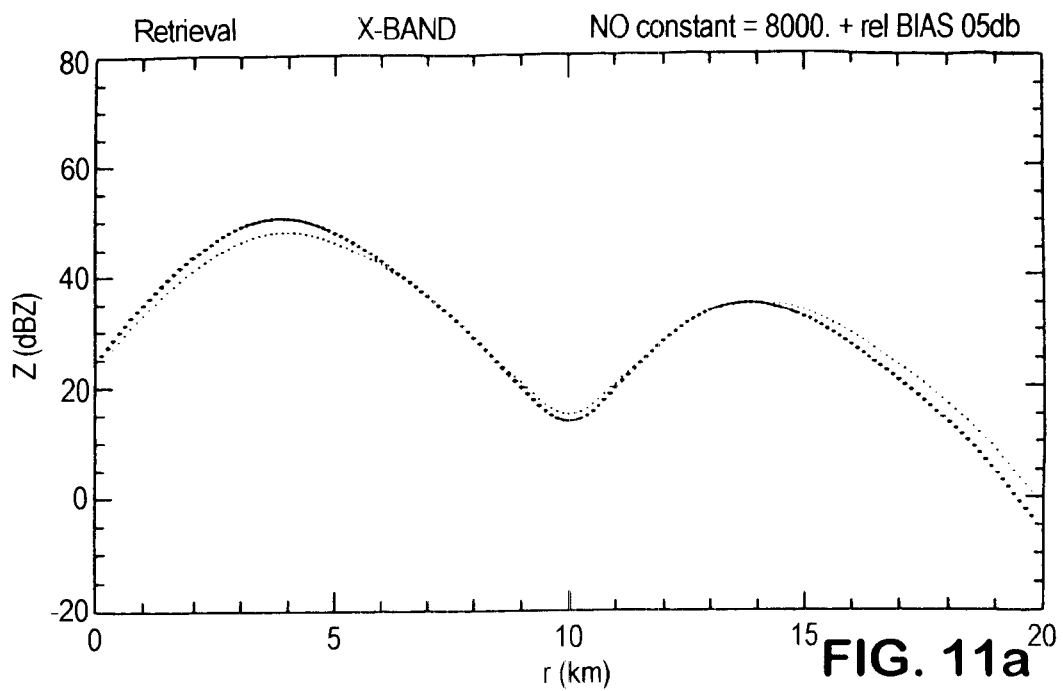
Figure 11B:
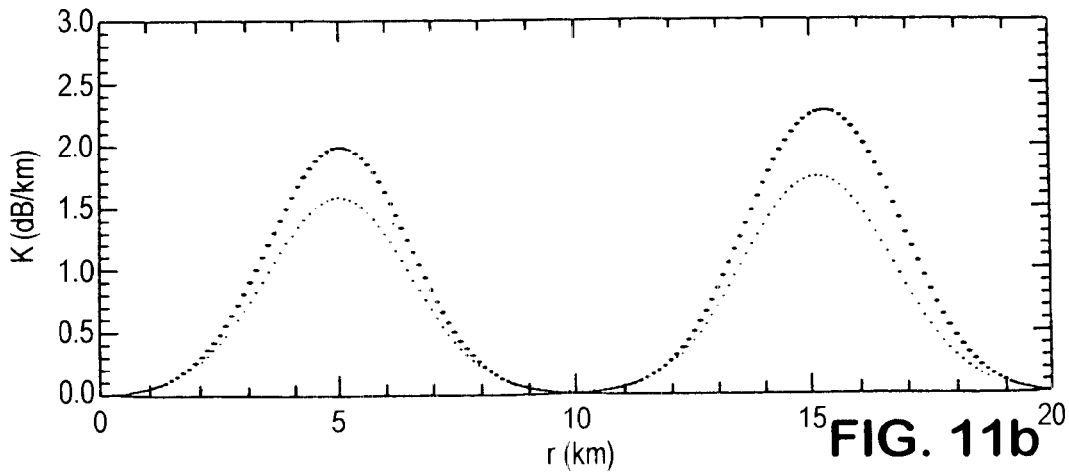
Figure 11C:
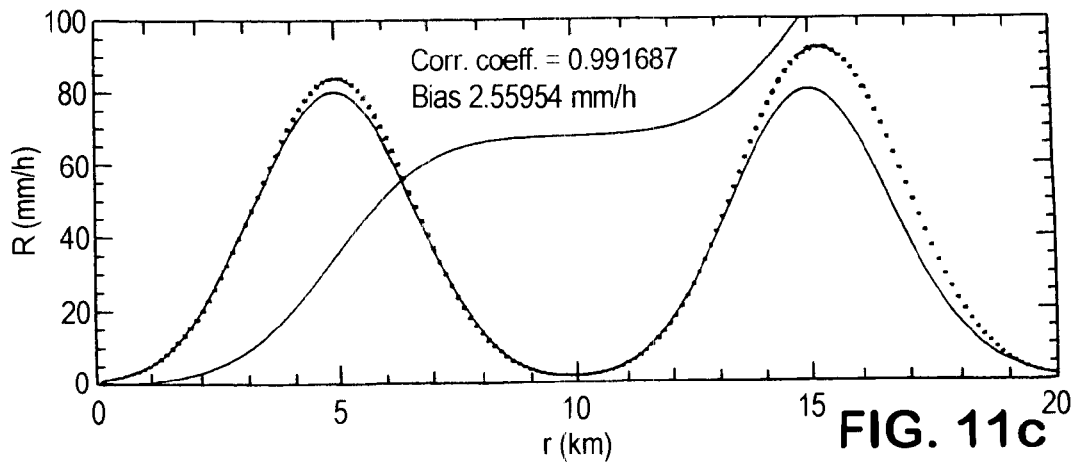
Figure 12A:
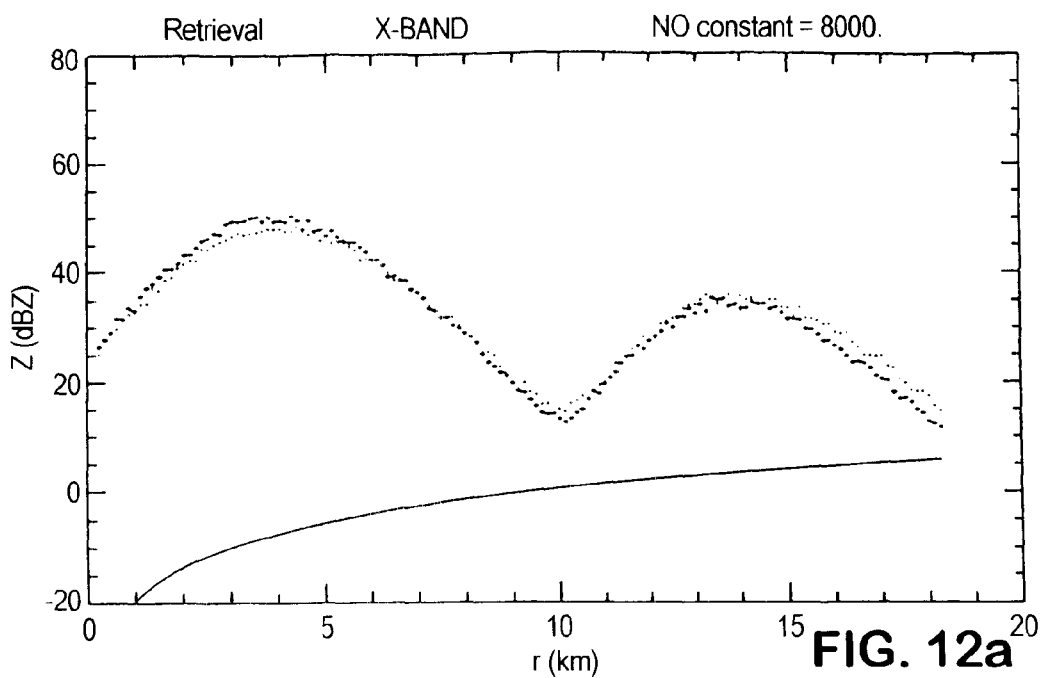
Figure 12B:
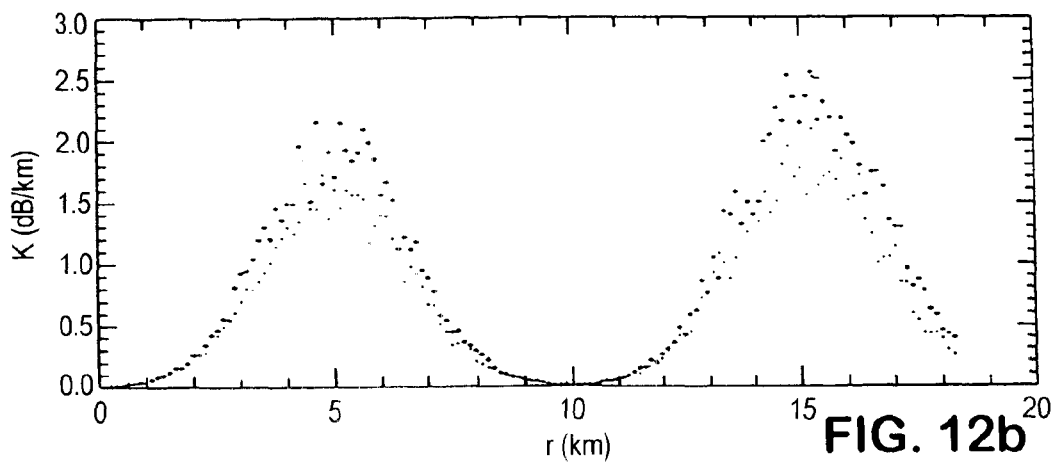
Figure 12C:
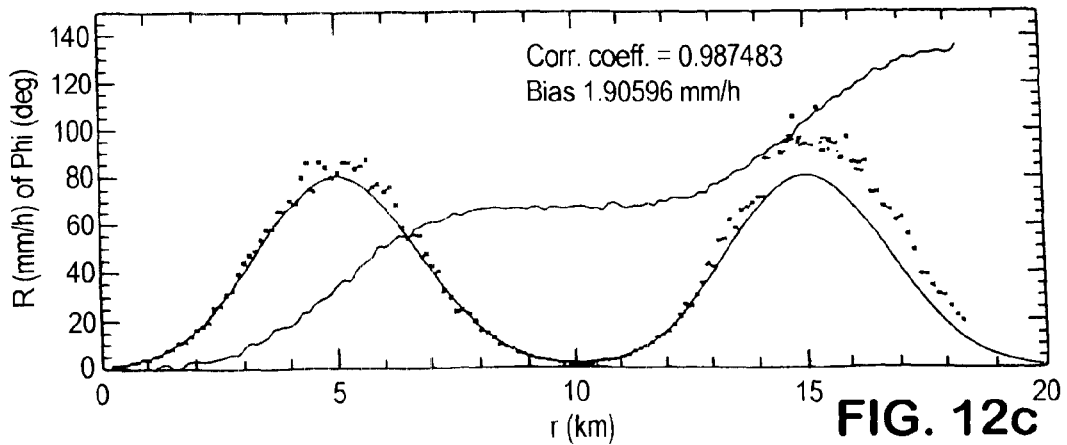
Figure 14A:
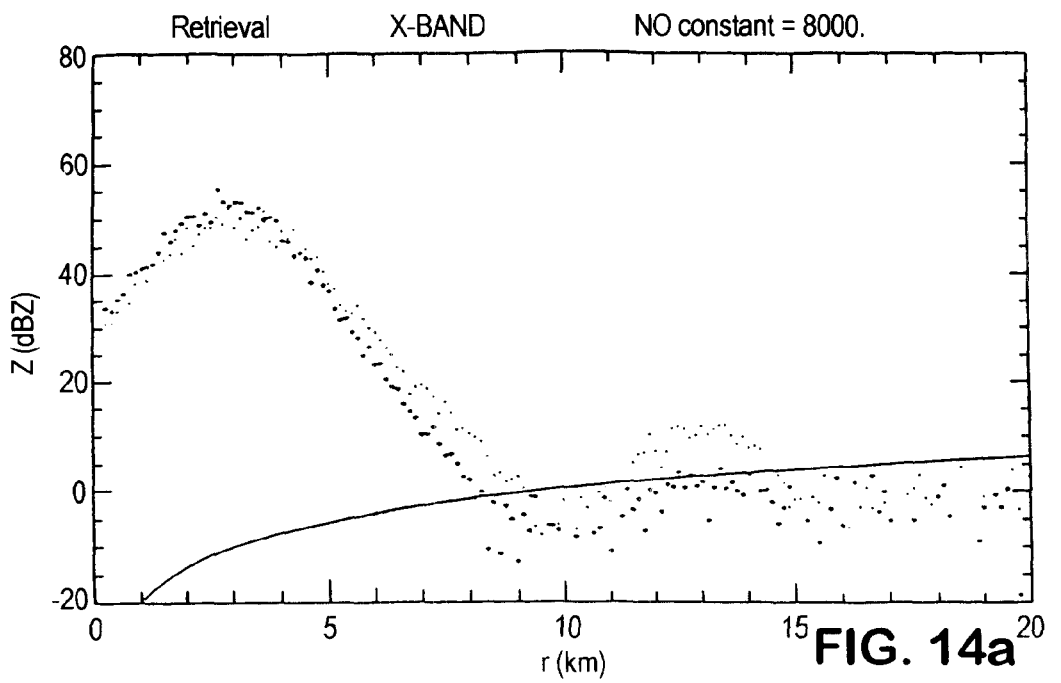
Figure 14B:
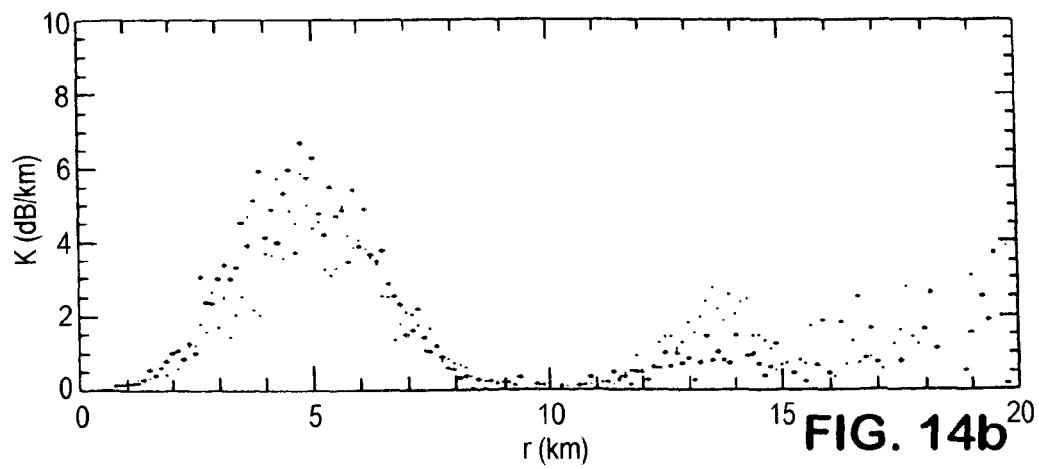
Figure 14C:
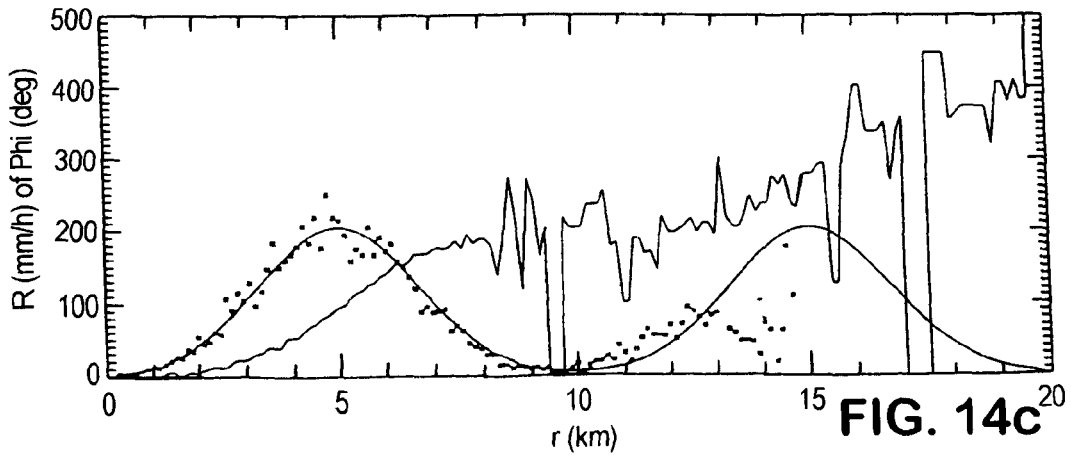
Figure 15A:
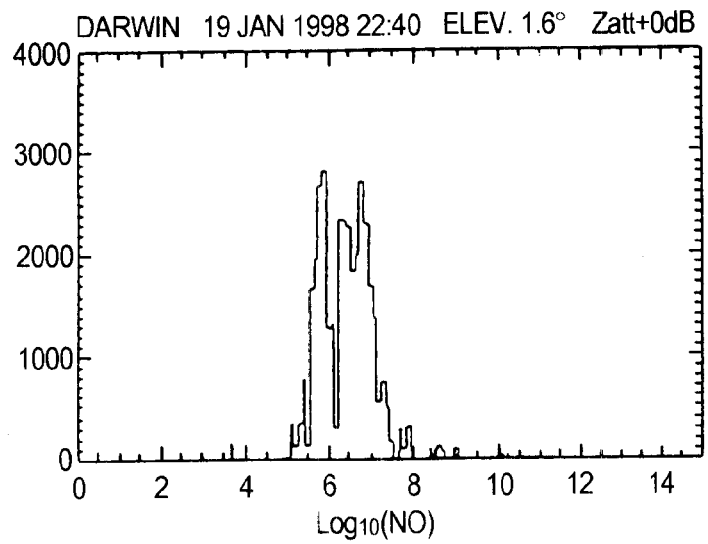
Figure 15B:
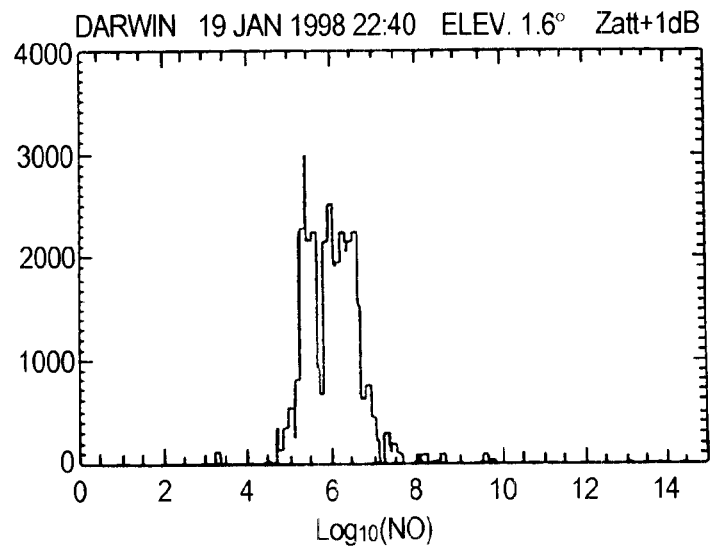
Figure 15C:
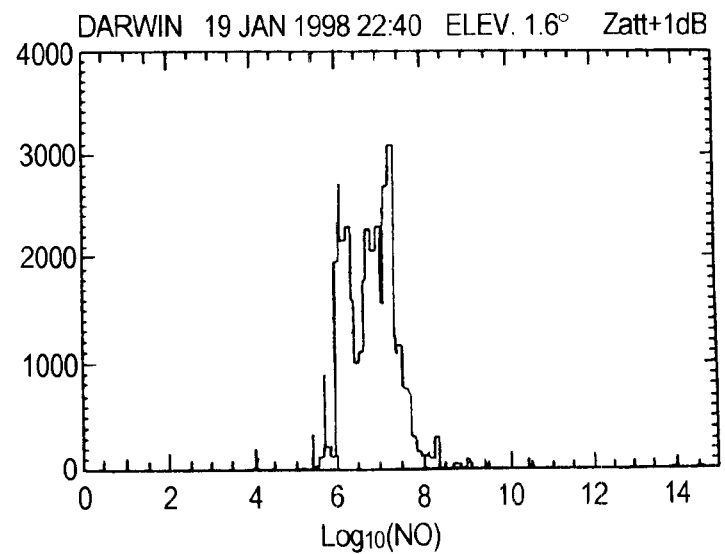
Figure 15D:
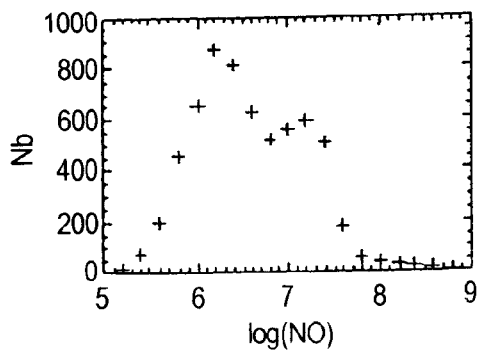
Figure 16A:
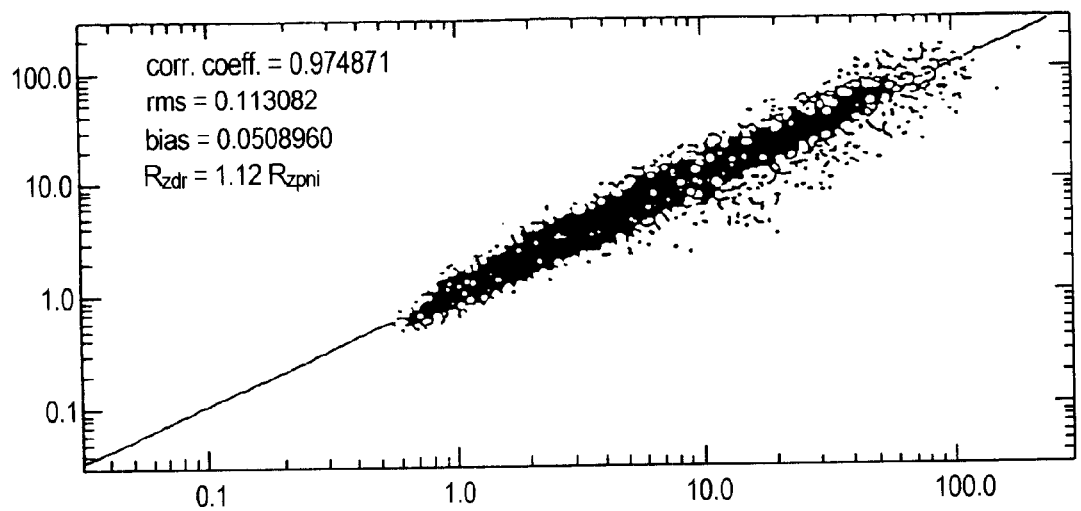
Figure 16B:
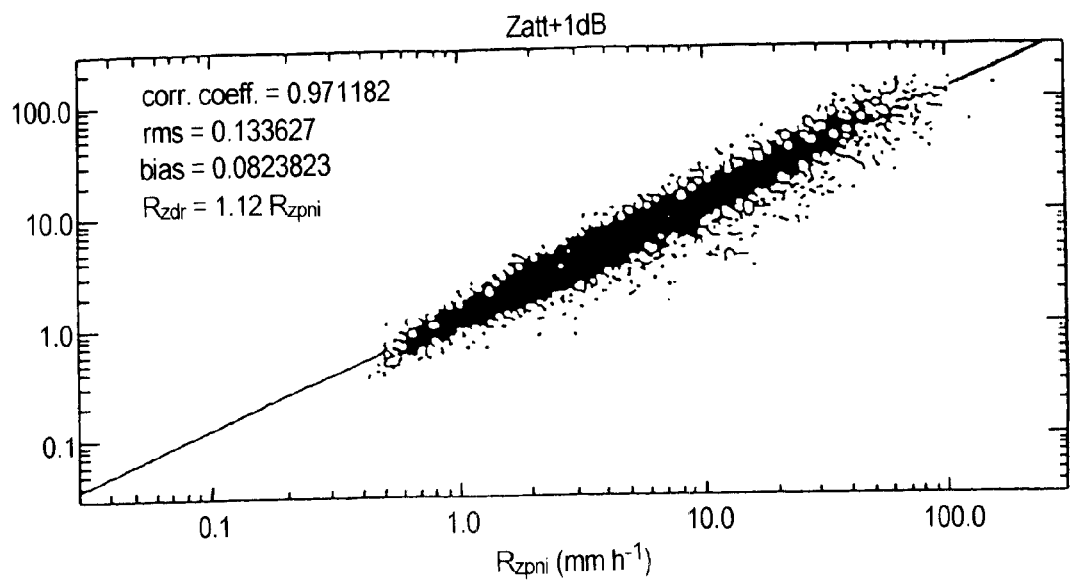
Figure 16C:
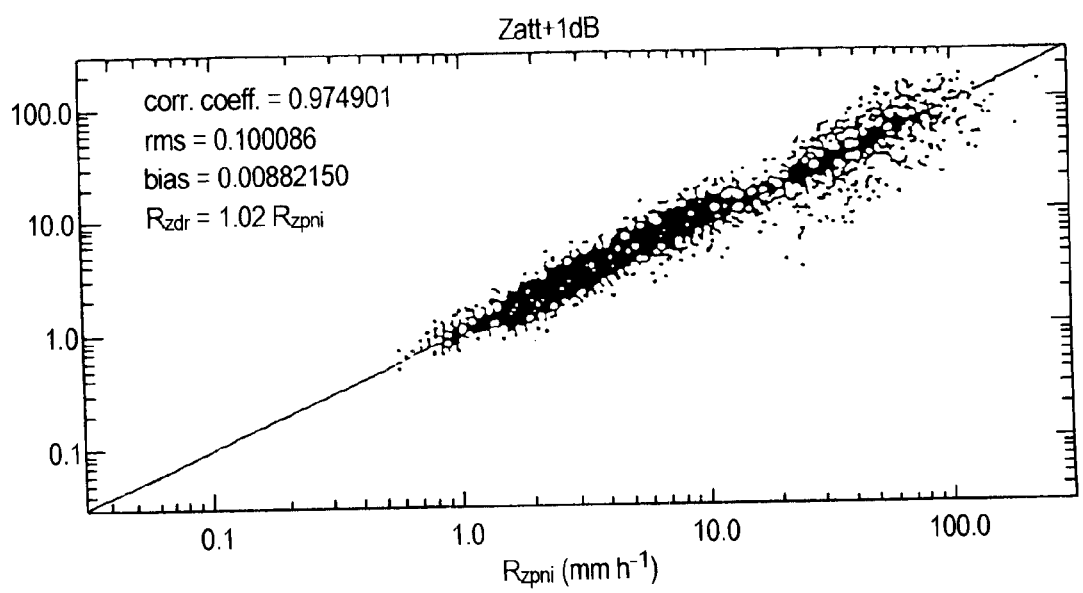

FIG. 6 is a graph on which has been plotted a simulation of variations for the coefficient $N_0^*$ as a function of the path radius r FIGS. 7. to 7c are graphs on which have been plotted, for the case where $N_0^*$ is variable, the values obtained for the parameters Z, K and R;

FIGS. 8a to 8c and FIGS. 9a to 9c are graphs on which have been plotted the parameters Z, K and R obtained for absolute biases of 2dB and 5 dB respectively and for a value of $N_0$ and a capture equal to 8000;

FIGS. 10a to 10c and 11a to 11c are figures similar to those of FIGS. 8a to 8c and 9a to 9c in the case of relative biases taken equal to 0.2 dB and 0.5 dB respectively;

FIGS. 12a to 12c and 13a to 13c are graphs on which have been plotted the values obtained for the parameters Z, K and R in the case of retrieval from a number of samples equal to 60 and from a number of samples equal to 10;

FIGS. 14a to 14c are graphs on which have been plotted the values obtained for the parameters Z, K and R in the case of a maximum rainfall rate of 200 mm/hour and of a noisy signal;

FIGS. 15a to 15d are histograms illustrating a possible calibration technique;

FIGS. 16a to 16c are scattergrams illustrating another possible calibration technique.

DETAILED DESCRIPTION

The process which will now be described implements a processing on the differential phase Φdp and the attenuated reflectivity $Z_H$ (or $Z_V$) according to the H (or V) polarization (reflectivity Z in the remainder of the text).

In a first step, an interval $[r_1, r_0]$ in which the data Z and Φdp are continuously available, is determined for the radial distance r from the radar antenna.

It is known that the Hitschfeld-Bordan equation may be written:

$$u^{b-1}\frac{du}{dr} = -0.46aZ^b \quad (1)$$

with $u = Z/Z_0$ where $Z_0$ is the unattenuated reflectivity and Z the apparent reflectivity, and where a and b are the two parameters of the power law $K = a Z_0^b$, in which K is the specific attenuation. It is recalled that a varies strongly, whereas b is stable.

The solution of this equation (1) is, when integrating between two limits $r_1$ and $r_2$:

$$[u^b]_{r_1}^{r_2} = -0.46ab\int_{r_1}^{r_2} Z^b ds \quad (2)$$

By expressing (2) between r and $r_0$, it follows that:

$$\frac{Z^b(r)}{K(r)} - \frac{Z^b(r_0)}{K(r_0)} = I(r, r_0) \quad (3)$$

where $$I(r,r_0) = 0.46b\int_r^{r_0} Z^b ds \quad (4)$$

and where $K = a Z_0^b$

Equation (3) provides an estimator of K(r) which we will seek to constrain through the Φdp information while adjusting $K(r^0)$. To do this, (3) is transformed into $$K(r) = K(r_0)\frac{Z^b(r)}{Z(r_0) + K(r_0) \cdot I(r, r_0)} \quad (5)$$

Now, the derivative of the phase Φdp with respect to the path r, or rate of variation of the differential phase Kdp, is a quasi-linear function of the specific attenuation K (that is to say $K_H$ or $K_V$, depending on the polarization with which one is working).

Consequently, $$\int_{r_1}^{r_0} K(s)ds = \gamma(\Phi_{dp}(r_0) - \Phi_{dp}(r_1)) \quad (6)$$

where γ is a known proportionality parameter i.e.:

$$K(r_0)\int_{r_1}^{r_0}\frac{Z^b(s)}{Z(r_0) + K(r_0) \cdot I(s, r_0)}ds = \gamma \cdot (\phi_{dp}(r_0) - \phi_{dp}(r_1)) \quad (7)$$

i.e., after integration:

$$K(r_0) = \frac{Z^b(r_0)}{I(r_1, r_0)}\{10^{0.2b\gamma\Delta\phi} - 1\} \quad (8)$$

where $\Delta\Phi = \Phi_{dp}(r_0) - dp(r1)$.

From this estimate of $K(r_0)$, we determine K(r) at every point of the interval $[r_1, r_0]$ from equation (3).

We thus find:

$$K(r) = \frac{Z^b(r) \cdot \{10^{0.2b\gamma \cdot \Delta\phi} - 1\}}{I(r, r_0) + \{10^{0.2b\gamma \cdot \Delta\phi} - 1\} \cdot I(r, r_0)}. \quad (9)$$

We note that the benefit of this formulation is on the one hand that it provides a solution K(r) which is independent of the parameter a which is precisely the one which fluctuates the most, and, on the other hand, that it harnesses a differential measurement of the differential phase, which is much easier to achieve than an absolute measurement.

This makes it possible to estimate the value of the precipitation rate R(r), by using for example for this purpose charts giving R(r) as a function of K(r) for various values of the parameter a, which can itself be determined from the relation:

$$K(r_0) = a \, Z_0(R_0)^b$$

By implementing the processing just described for both of the two polarizations H and V, we end up with two estimates of R which it is possible to amalgamate in order to validate a final value.

In an implementational variant allowing still greater fineness of analysis, the "universal" parametric relations between the true reflectivity (unattenuated) $Z_0$ (mm$^6$.m$^{-3}$), the specific attenuation K (db.km$^{-1}$), the specific differential phase $K_{DP}$ (deg.km$^{-1}$), and the precipitation rate R (mm.hr$^{-1}$) are used; These are written:

$$K = a[N_0^*]^{(1-d)} \cdot Z_0^b$$

$$R = c[N_0^*]^{(1-d)} \cdot K^d$$

$$K = \gamma/2 K_{DP}$$

where the parameters a, b, c, d, $\gamma$ are known (for a given temperature), and where $N_0^*$ is a parameter characteristic of the dimensional distribution N(D) [number density of raindrops per interval of diameter in m$^{-4}$] of the raindrops which one is proposing to determine by the algorithm $N_0^*$ (m$^{-4}$) is expressed as a function of the liquid water content W (g/m$^{-3}$) and of the median volumic diameter $D_0$ as:

$$N_0^* = [181/(\pi \rho_w)] W/D_0^{\vec{4}}$$

(where $\rho_w$ is the density of water in g/m$^3$).

The relevance of this parametric representation is illustrated by FIGS. 1a and 1b on which have respectively been represented on the one hand the scattergram of the R-Z relation obtained from 11853 spectra N(D) measured by in-situ probe during the TOGA-COARE airborne experiment and on the other hand the same scattergram after normalizing each of the parameters by $N_0^*$ (the TOGA-COARE experiment took place in the west Pacific between November 1992 and February 1993, the PMS sensor being mounted on the NCAR's Electra aircraft. The primary processing of the data was done by R. BLACK from the NOAA (HRD Miami). The data are available on the HRD Miami server).

An estimator of $N_0^*$ is given by:

$$N_0^* = \left[ a^{-1} \frac{K(r_0)}{Z^b(r_0) + K(r_0) \cdot I(r_1, r_0)} \right]^{\frac{1}{1-b}} \quad (10)$$

We then calculate R(r) between $r_1$ and $r_0$ by substituting K(r) and the value of $N_0^*$ into the relation:

$$R = c[N_0^*]^{(1-d)} \cdot K^d \quad (11)$$

The processing just described has been tested with a rig of the type illustrated in FIG. 2 which comprises:

a transmitter 1;

a 3dB power divider 2 receiving the output signal from the transmitter 1;

a mode (or orthomode) extractor 3 linked by two channels H and V to the outputs of a power divider 2;

a horn antenna 4 transmitting or receiving the two H and V polarizations;

circulators 5 (filtering tee) interposed, on the H and V channels, between the mode extractor 3 and the power divider 2;

a phase shifter 6 interposed, on the V channel, between the power divider 2 and the mode extractor 3;

reception means 7 linked, for the H and V channels, to the circulators 5;

an oscillator 9 which synchronizes the transmitter 1 and the reception means 9;

means 8 for sampling, and then for processing the I and Q outputs from these reception means 7, these processing means 8 allowing the determination from the parameters ZH, ZV and $\Phi$DP, which in complex notation satisfy:

$$Z_{H,V} = [I_{H,V}^2 + Q_{H,V}^2]^{1/2}$$

and $$\Phi DP = 1 \arg [(I_H + i Q_H) \cdot (I_V - i Q_V)]$$

where $I_{H,V}$ and $Q_{H,V}$ are the values obtained by sampling the I and Q outputs of the H and V channels.

It is these processing means 8 which implement the determination processing described hereinabove.

The operating parameters of this device were as follows:

detection threshold of the radar at 0 dB SNR and at 10 km: 0 dBZ;

number of independent samples $N_i$ in the resolution cell: 10 or 60 radial resolution: 75 metres noise in the measurement of $\Phi_{DP}$: ±1 degree (for $N_i$=60), degrees ±3 degrees (for $N_i$=10)

dimensional distribution of the drops exponential: N(D)= $N_0$ exp (−$\Lambda$D) [where D is the mean diameter of the drops and where diameter $\Lambda$ is a parameter], with $N_0$ constant along the radial (with the following values: 800, 8000 [Marshall and Palmer value], 80,000, or continuously variable proportionally to R.

Under these conditions, the following various results were obtained:

1) $N_0^*$ Constant

FIGS. 3a to 3c, 4a to 4c, 5a to 5c depict the retrieved rainfall rates for constant $N_0^*$ over the radial and equal to 800, 8000, 80,000 respectively. In these three cases, it may be seen that the retrieved rainfall rates are very similar to the simulated rainfall rates, and that the retrieved value of the parameter $N_0^*$ is on each occasion relatively similar to that used for the simulations.

2) $N_0^*$ Varying with Rainfall Rate

The inventors have also tested the processing on simulations which are still realistic but carried out with an $N_0^*$ which depends on the rainfall rate, this complying fairly well with reality but rendering the retrieval of the precipitation rate "fairly perilous". The relation used between $N_0^*$ and the precipitation rate is the following:

$$N_0^* = \frac{10^{\log(R)+66}}{1000}$$

For rainfall rates varying from 0 to 80 mm/h, it may be seen that the parameter $N_0^*$ sweeps a very wide range, covering more than one decade. By way of indication, presented in FIG. 6 are the variations of $N_0^*$ over the simulated radial. The retrievals obtained with the processing described earlier are depicted in FIGS. 6a to 6c. The maximum deviation observed is of the order of 20%, which seems to be reasonable in the case of "such unfavorable" simulations.

3) Effects of Relative and Absolute Bias

FIGS. 8a to 8c and 9 to 9c depict the results obtained with an absolute bias of 2 dB and 5 dB respectively. A value of absolute bias of 2 dB induces a non-negligible error in the estimation of the parameter $N_0^*$, but does not penalize the retrieval since the retrieved rainfall rates differ by only a few per cent from those which were simulated. On the other hand, an absolute bias of 5 dB seems to be crippling. The results obtained in the case of relative biases of 0.2 dB and 0.5 dB, and which are depicted in FIGS. 10a to 10c and 11 to 11c, show the weak sensitivity of this algorithm to a relative calibration error between the two polarizations.

4) Effects of Noise.

Figure 13A:
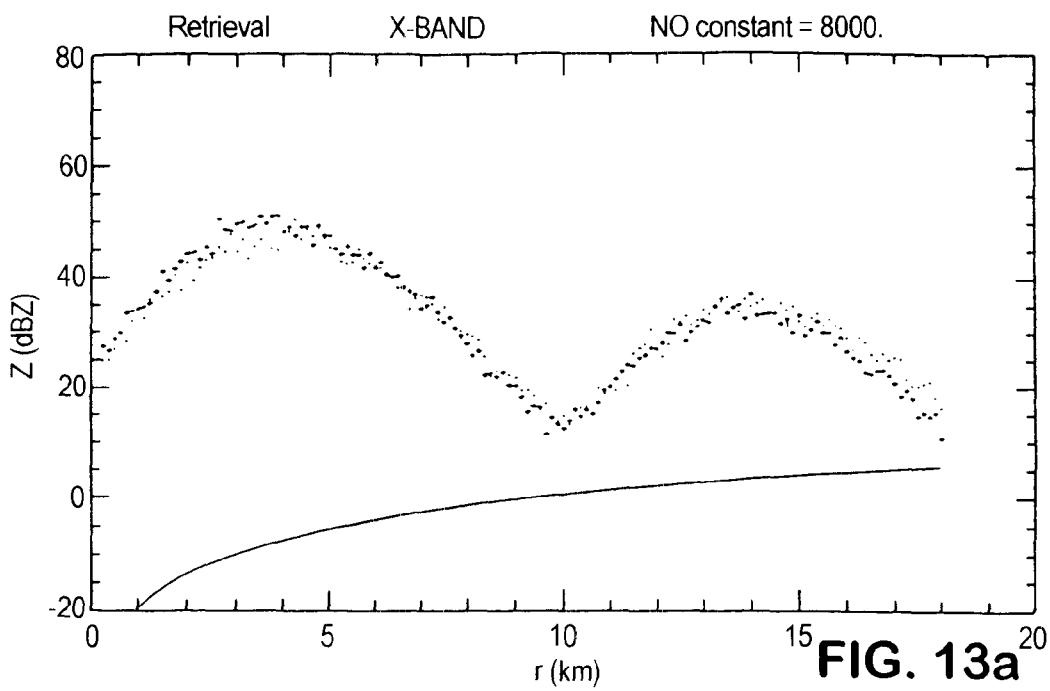
Figure 13B:
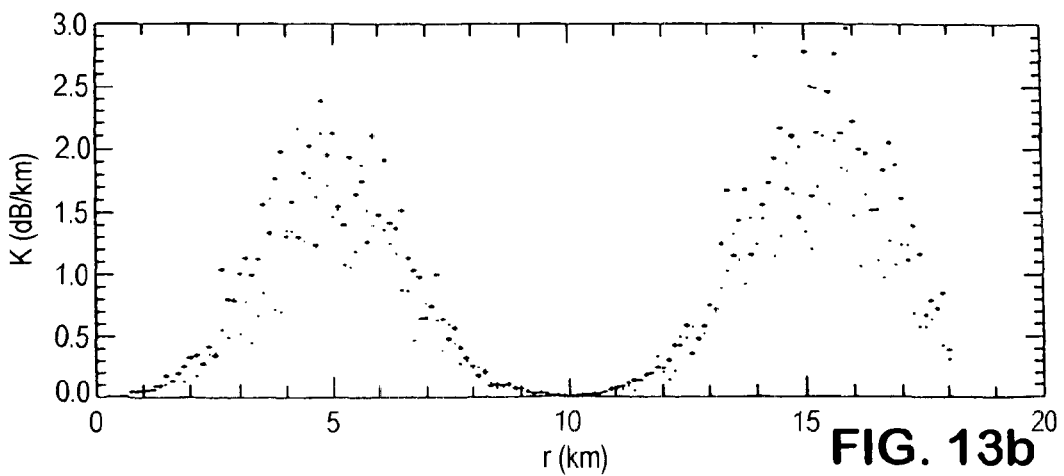
Figure 13C:
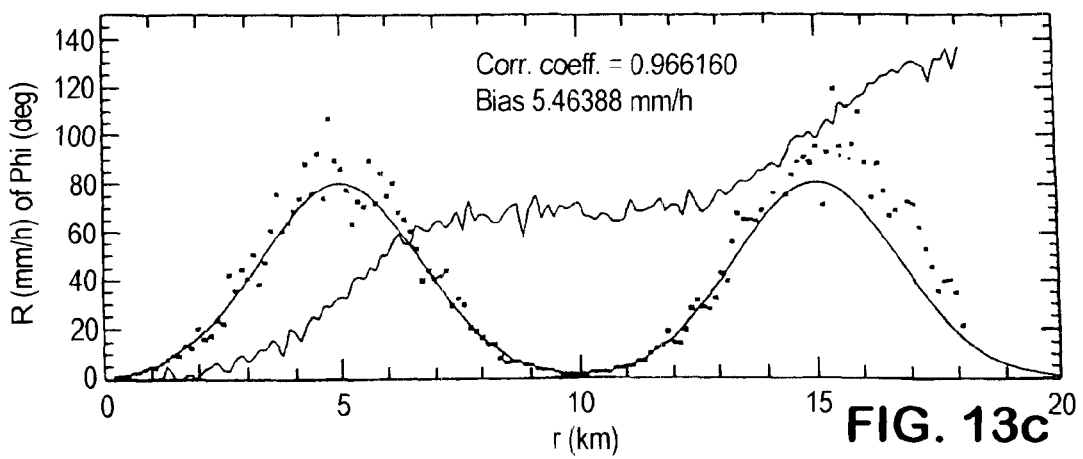

The inventors have tested the effect of noise on the retrievals in the case of a number of samples of 60 (FIGS. 12a to 12c) and in the less favorable case of 10 samples (FIGS. 13a to 13c). In these two cases, the measurement the measurement of the integrated phase exhibits noise of 3 degrees. Retrieval is effected so long as the signal-to-noise ratio is sufficient. For a maximum rainfall rate of 80 mm/h, such is the case up to a radial distance of around 19 km. The results obtained confirm the very stable behavior of the KDP algorithm. Under these conditions, correlation coefficients of greater than 0.95 and biases of less than 4 mm/h are entirely satisfactory.

5) Case of Very High Rainfall Rates

The inventors have verified the robustness of the algorithm in the case of high rainfall rates, reaching 200 mm/h and a noisy signal. In this case, the signal is fairly rapidly swamped by the noise, and it obviously becomes impossible to retrieve the second precipitation cell on account of the very strong attenuation of the radar signal by the first. However, the rainfall rates obtained up to around 10 km are consistent and the whole of the first precipitation cell is very adequately retrieved (FIGS. 14a to 14c).

The processing has also been tested in bands other than the X-band and in particular in the C-band and S-band. The results obtained are just as satisfactory as in the X-band.

Thus, with the processing just described, one has a precipitation rate estimator which is particularly stable with regard to noise and/or with regard to the bias in the reflectivities and in the phase. This processing succeeds, even in difficult cases (high rainfall rate, No varying rapidly with rainfall rate) in retrieving the rainfall rate in a very encouraging manner.

The processing of the data is possible as long as the signal-to-noise ratio is greater than 1. Under these conditions, the bias in the estimator of R does not exceed 5% and its standard deviation 10%. The performance of the estimator is independent of $N_0^*$ (when it is assumed to be constant along the radial), and is only slightly impaired under the conditions of variable $N_0^*$. Absolute calibration of the radar to ±2 or 3 dBZ is sufficient to ensure such performance. This calibration is not necessary which to refine the R-K relation from which one estimates R. No specification is necessary as regards the relative calibration of the H and V channels.

Several calibration techniques may be envisaged.

According to one of them, the histogram of the $N_0^*$ observed by spectropluviometer on the ground is compared with the histogram of the $N_0^*$ retrieved by the radar over a large number of radii. In the presence of a reflectivity calibration error $\delta C$, we then measure $\delta C.Z$ believing that we are measuring Z), the estimator of $N_0^*$ given by (10) is then multiplied by the factor $(\delta C)^{-b/(1-b)}$.

By correlating the histogram measured on the ground and that measured by the radar, we determine $\delta C$. If no ground spectropluviometer is available, fairly precise calibration can be obtained by demanding that the histogram of the $N_0^*$, as measured by the radar, be centered on the Marshall and Palmer value ($N_0^*=0.8 \cdot 10^7$ m$^{-4}$) after re-calibration. An illustration of this calibration technique is given in FIGS. 15a to 15c which represent the histogram of $N_0^*$ which have been retrieved from a volume scanning of the Darwin radar (polarimetric C-band radar), (a) leaving the measured reflectivities as is, (b), raising them by 1 dB, (c), lowering them by 1 dB.

By comparing these histograms with the "actual" histogram of $N_0^*$, i.e. as determined in the same region from TOGA-COARE airborne data (see FIG. 15d), it may be seen that the 1 dB lowering enables the histogram obtained with the processing proposed by the invention to be matched to the actual histogram.

According to another calibration technique, which advantageously supplements the techniques just described, the following other "universal" relations are used:

(i) between R, K and ZDR (where ZDR=ZH/ZV)

$$R = K \cdot (ZDR)^f \qquad (12)$$

(ii) between the differential attenuation $K_H - K_V$ and the attenuation under H polarization, $K_H$:

$$K_H - K_V = \alpha [N_0^*]^{1-\beta} K_H^\beta \qquad (13)$$

Where $\alpha$, $\beta$ and f are known parameters.

We calculate ZDR from $$ZDR = ZDR_a \cdot 10^{\int_{r_1}^{r_0} \alpha V_*^{-1} \beta - Z^b \, ds} \qquad (14)$$

then we calculate R from (12).

Two independent estimators of the precipitation rate (the estimator (12) and that given by (11)) are then compared statistically (in a scattergram).

We then adjust $\delta C$ to obtain optimal consistency. For the same set of data the scattergrams given in FIGS. 16a to 16c illustrate this technique.

Plotted in FIG. 16a is a scattergram for the scatter between the estimator (11) [deduced from K alone], and the estimator (12) [deduced from K and from ZDR]. Here the measured reflectivities are used as is, and it is found that (12) overestimates by 12% relative to (11).

Plotted in FIG. 16b is a scattergram of the scatter between the estimator (11) [deduced from K alone] and the estimator (12) [deduced from K and ZDR]. Here, the measured reflectivities are raised by 1 dB, and it is found that (12) overestimates by 21% relative to (11).

Plotted in FIG. 16c is a scattergram of the scatter between the estimator (11) [deduced from K alone] and the estimator

(12) [deduced from K and ZDR]. Here, the measured reflectivities are lowered by 1 dB, and it is found that there is perfect agreement (to within 2%) between (11) and (12).

Thus, the best consistency is again obtained by considering a 1 dB lowering of the reflectivities.

The rainfall rate estimator just described is particularly advantageous in the case of estimating rainfall over drainage basins for the monitoring of highwater floods and the management of water resources. This monitoring and this management nowadays rely on runoff/infiltration models whose main limitation as regards predictive performance stems from poor knowledge of the water sheet entering the system.

What is claimed is:

1. A process for estimating a precipitation rate by means of a bipolar radar, comprising:

differential phase Φdp and attenuated reflectivity Z according to at least one of polarizations H or V are measured by means of said bipolar radar, over a given interval $[r_1, r_0]$ of path radius r with respect to said radar, wherein a reflectivity profile Z(r) is determined, an estimate of the attenuation value at $r_0 K(r_0)$ is determined from the attenuated reflectivity profile thus measured, as well as from a difference in differential phase between $r_0$ and $r_1$;

an estimate of the specific attenuation at r K(r) as a function of the attenuation $K(r_0)$ thus determined and of the attenuated reflectivity profile Z(r) is determined, wherein the estimate K(r) of the specific attenuation is determined as a function of r from the equation $$\frac{Z^b(r)}{K(r)} - \frac{Z^b(r_0)}{K(r_0)} = I(r, r_0)$$

and wherein the estimate of the value $K(r_0)$ of the attenuation $R_0$ is determined from the equation $$K(r_0) \int_{r_1}^{r_0} \frac{Z^b(s)}{Z^b(r_0) + K(r_0) \cdot I(s, r_0)} ds = \gamma \cdot (\phi_{dp}(r_0) - \phi_{dp}(r_1))$$

where:

$I(s, r_0) = 0.46 b \int_r^{r_0} Z^b(u) du,$ b being the exponent of the power relation $K(r) = a[Z_0(r)]^b$ ($Z_0$:unattenuated reflectivity)

and where γ is the parameter of proportionality between the specific attenuation and the differential rate of variation of the phase;

the rate of precipitation R(r) is determined knowing K(r).

2. The process according to claim 1 wherein the rate of precipitation R(r) is determined from the relation $R = c[N_0^*]^{(1-d)} \cdot K^d.$ where c and d are parameters and where $N_0^*$ is given by:

$$N_0^* = \left[ a^{-1} \frac{K(r_0)}{Z^b(r_0) + K(r_0) \cdot I(r_1, r_0)} \right]^{\frac{1}{1-b}}.$$

3. The process according to claim 1, wherein the attenuated reflectivity Z is measured for both of the two polarizations H or V and in that the precipitation rate R(r) for a given path radius r is determined for both of these two polarizations.

4. The process according to claim 3, wherein a calibration is effected by comparing the estimated histograms with an actual histogram.

* * * * *